(12) United States Patent
Van Ommeren

(10) Patent No.: US 10,677,909 B2
(45) Date of Patent: Jun. 9, 2020

(54) METHOD FOR DETERMINING THE IMPACT POINT OF A PROJECTILE FIRED AT A TARGET ABOVE SEA SURFACE, AND RADAR SYSTEM IMPLEMENTING SUCH METHOD

(71) Applicant: Thales Nederland B.V., Hengelo (NL)

(72) Inventor: Marinus Josephus Servatius Van Ommeren, Borne (NL)

(73) Assignee: THALES NEDERLAND B.V., Hengelo (NL)

(*) Notice: Subject to any disclaimer, the term of this patent is extended or adjusted under 35 U.S.C. 154(b) by 0 days.

(21) Appl. No.: 14/362,950

(22) PCT Filed: Nov. 30, 2012

(86) PCT No.: PCT/EP2012/074049
§ 371 (c)(1),
(2) Date: Jun. 5, 2014

(87) PCT Pub. No.: WO2013/083483
PCT Pub. Date: Jun. 13, 2013

(65) Prior Publication Data
US 2014/0327568 A1 Nov. 6, 2014

(30) Foreign Application Priority Data
Dec. 8, 2011 (EP) .................................. 11192625

(51) Int. Cl.
*G01S 13/72* (2006.01)
*G01S 13/42* (2006.01)
(Continued)

(52) U.S. Cl.
CPC .......... *G01S 13/726* (2013.01); *G01S 13/424* (2013.01); *G01S 13/72* (2013.01); *F41G 3/142* (2013.01); *G01S 17/86* (2020.01)

(58) Field of Classification Search
CPC .......... G01S 13/72–726; G01S 13/424; G01S 17/023; G01S 17/86; F41G 3/142
See application file for complete search history.

(56) References Cited

U.S. PATENT DOCUMENTS 3,113,305 A * 12/1963 Trounson .............. F42C 13/047
102/214
3,758,052 A * 9/1973 McAlexander ....... F42C 13/047
102/380
(Continued)

FOREIGN PATENT DOCUMENTS

WO 03/067278 8/2003

OTHER PUBLICATIONS

International Search Report and Written Opinion for PCT/EP2012/074049 dated Mar. 1, 2013.

*Primary Examiner* — Matthew M Barker
(74) *Attorney, Agent, or Firm* — Snell & Wilmer L.L.P.

(57) ABSTRACT

There is disclosed a method for determining the impact point of a projectile fired at a target (15) tracked by use of a radar antenna (11) through a dedicated antenna beam, the method being characterized in that it comprises at least a step of measuring the range and bearing of the projectile based upon the use of said radar antenna (11) and said dedicated antenna beam, a step of Doppler filtering distinguishing the projectile measurements from the tracked target (15) and sea clutter measurements, and a step of determining the projectile trajectory (131) from a plurality of range and bearing measurements performed at successive instants of time ($t_i$), and a step of determining the impact point of the determined projectile based upon the projectile trajectory (131). The current invention can be applied to splash spot location prediction and miss distance indication.

14 Claims, 2 Drawing Sheets

Figure 1A:
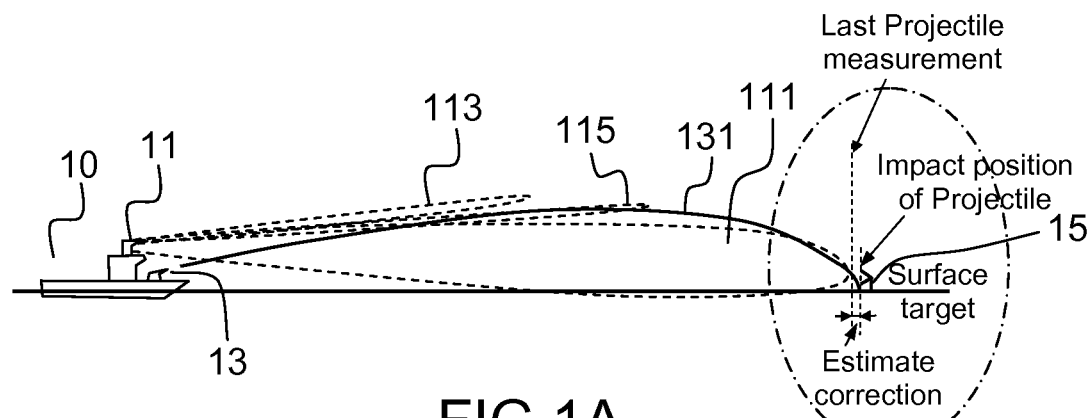

(51) Int. Cl.
*F41G 3/14* (2006.01)
*G01S 17/86* (2020.01)

(56) References Cited

U.S. PATENT DOCUMENTS

| | | | | |
|---|---|---|---|---|
| 4,008,869 A * | 2/1977 | Weiss | ........................ | F41G 7/30 |
| | | | | 235/400 |
| 4,606,514 A * | 8/1986 | Sundermeyer | ............ | F41G 7/22 |
| | | | | 244/3.15 |
| 4,622,554 A * | 11/1986 | Gellekink | ............... | F41G 3/142 |
| | | | | 342/67 |
| 4,922,802 A * | 5/1990 | Gropp | ..................... | F41G 3/142 |
| | | | | 342/67 |
| 5,102,065 A * | 4/1992 | Couderc | ................. | F41G 7/303 |
| | | | | 244/3.11 |
| 5,140,329 A | 8/1992 | Maughan | | |
| 5,631,654 A * | 5/1997 | Karr | ....................... | G01S 11/12 |
| | | | | 250/342 |
| 5,697,578 A * | 12/1997 | Catchesides | .......... | F41G 7/2266 |
| | | | | 244/3.11 |
| 6,037,896 A | 3/2000 | Dekker | | |
| 6,392,588 B1 * | 5/2002 | Levanon | ............... | G01S 13/288 |
| | | | | 342/189 |
| 6,653,972 B1 * | 11/2003 | Krikorian | ............... | F41G 7/303 |
| | | | | 244/3.11 |
| 7,079,070 B2 * | 7/2006 | Kongelbeck | .......... | F41G 7/2266 |
| | | | | 244/3.1 |
| 8,035,549 B1 * | 10/2011 | Malakian | ............. | G01S 13/723 |
| | | | | 342/106 |
| 8,106,814 B2 * | 1/2012 | Durand | ................... | G01S 13/66 |
| | | | | 342/106 |
| 2004/0065189 A1 * | 4/2004 | Margalit | ................. | F41G 3/142 |
| | | | | 89/203 |

* cited by examiner

METHOD FOR DETERMINING THE IMPACT POINT OF A PROJECTILE FIRED AT A TARGET ABOVE SEA SURFACE, AND RADAR SYSTEM IMPLEMENTING SUCH METHOD

CROSS-REFERENCE TO RELATED APPLICATIONS

This application is a U.S. national phase filing under 35 U.S. C. § 371 of PCT/EP2012/074049 filed Nov. 30, 2010 and claims priority from EP Application No. 11192625.9 which was filed Dec. 8, 2011, all of which are incorporated herein by reference in their entirety.

The present invention relates to a method for determining the impact point of a projectile fired at a target above sea surface, and to a radar system implementing such a method. For example, the invention is particularly applicable to splash spot predictive location and miss distance calculation.

Location of the impact of a projectile fired at a target evolving above the sea surface, typically a floating target, is not always measurable in a direct way. This may notably be the case when test ammunition are used or when the impact is masked by echoes of a larger target or by the sea clutter. In such cases, a prediction of the projectile impact position has to be performed. This requires monitoring of the projectile trajectory. However, at low elevation, these trajectory measurements become highly unreliable as a result of the multipath effect, due to the electromagnetic waves reflecting on the sea surface. Therefore, the projectile trajectory can only be monitored within a space referred to as "multipath-free zone", wherein multipath effects can be reasonably neglected. Outside of the multipath-free zone, a prediction of the projectile trajectory is performed. Monitoring the projectile trajectory in the multipath-free zone requires using a radar system comprising an antenna whose beam is essentially pointed toward the multipath free zone, therefore not pointed toward the surface target. One resulting drawback lies in the fact that a radar system shall comprise at least one first antenna beam pointing directly toward the target and allowing target tracking, and one second antenna beam, separate from the first, and used for monitoring the projectile trajectory. Another drawback lies in a limitation when firing at short-range targets: in such cases, the projectile trajectory is essentially similar to a straight line, and can sometimes not even enter the multipath-free zone.

For example, in an attempt to measure the trajectory of a projectile in an area which is corrupted neither by multipath effect nor by other unwanted echoes, a known method is described in U.S. Pat. No. 6,037,896, which discloses a method for determining an impact point of a projectile relative to the target by use of a separate beam to measure the projectile trajectory. Following this method, a first beam is pointed toward a separate direction above the corrupted area and above the surface target, while the surface target is monitored by a second beam.

A major drawback of this method lies in the fact that, due to the extra antenna beam pointing toward a separate direction than the surface target which is being tracked, the surface target cannot be detected in the centre of the beam anymore.

The present invention aims to provide a method for predicting the impact of a projectile, which may be used to overcome at least some of the drawbacks described above, especially through avoiding the use of two separate beams. For that purpose, the invention proposes to base projectile measurements on the range and azimuth only, and not on the height and elevation, and to exploit the disappearance of the projectile detections when the projectile hits the surface. At its most general, the invention proposes a method for determining the impact point of a projectile fired at a target, the target being tracked by use of a radar antenna through a single antenna beam. The method includes a step of measuring the range and the bearing of the projectile by use of a one and only radar antenna and one and only beam, the antenna beam being basically the antenna beam used for tracking the target. According to the present invention, difference in Doppler frequency is used to distinguish the projectile measurements from the tracked target and sea clutter measurements.

Thus, an advantage provided by the present invention in any of its aspects is that it allows projectile impact measurement without losing radar and electro-optical sight on the surface target. Moreover, it allows for measurement of projectiles at ranges close to the surface target. In addition, it is suitable for straight, low altitude projectile trajectories.

One further advantage of the current invention lies in that the proposed method and system do not require elevation measurements, which may not be reliable in low elevation situations.

For that purpose, the current invention proposes a method for determining the impact point of a projectile fired at a target tracked by use of a radar antenna beam, the method being comprising at least a step of measuring the range and bearing of the projectile based upon the use of said radar antenna beam, a step of Doppler filtering distinguishing the projectile measurements from the tracked target and sea clutter measurements, a step of determining the projectile trajectory from a plurality of range and bearing measurements performed at successive instants of time, and a step of determining the impact point of the determined projectile based upon the projectile trajectory.

In an exemplary embodiment of the invention, the method can further comprise a step of tracking at least one projectile.

In an exemplary embodiment of the invention, the impact point can be determined as the position of the latest projectile measurement.

In an exemplary embodiment of the invention, the impact point can be determined based upon the assumption the impact of the projectile occurs at a time instant timpact after an instant of time tn corresponding to the last detection of the projectile, the time instant timpact being defined by the relation: timpact=(tn+tn+1)/2, tn+1 being the time step following the time instant tn, the impact location being determined by means of estimation means.

In an exemplary embodiment of the invention, said estimation means can comprise a least squares method.

In an exemplary embodiment of the invention, said estimation means can comprise a Kalman filter.

In an exemplary embodiment of the invention, the method can further comprise a decision step, confirming the latest projectile measurement if no measurements have been obtained over a period of time longer than a given time-out period.

One other object of the current invention is a radar system comprising an antenna and processing means, wherein said processing means implement a method following any one of the described exemplary embodiments.

These and other characteristics and advantages of the invention will be made clearer in view of the detailed description given below of a preferred embodiment, provided by way of an illustrative and non-limiting example, as well as the accompanying drawings.

Figure 1B:
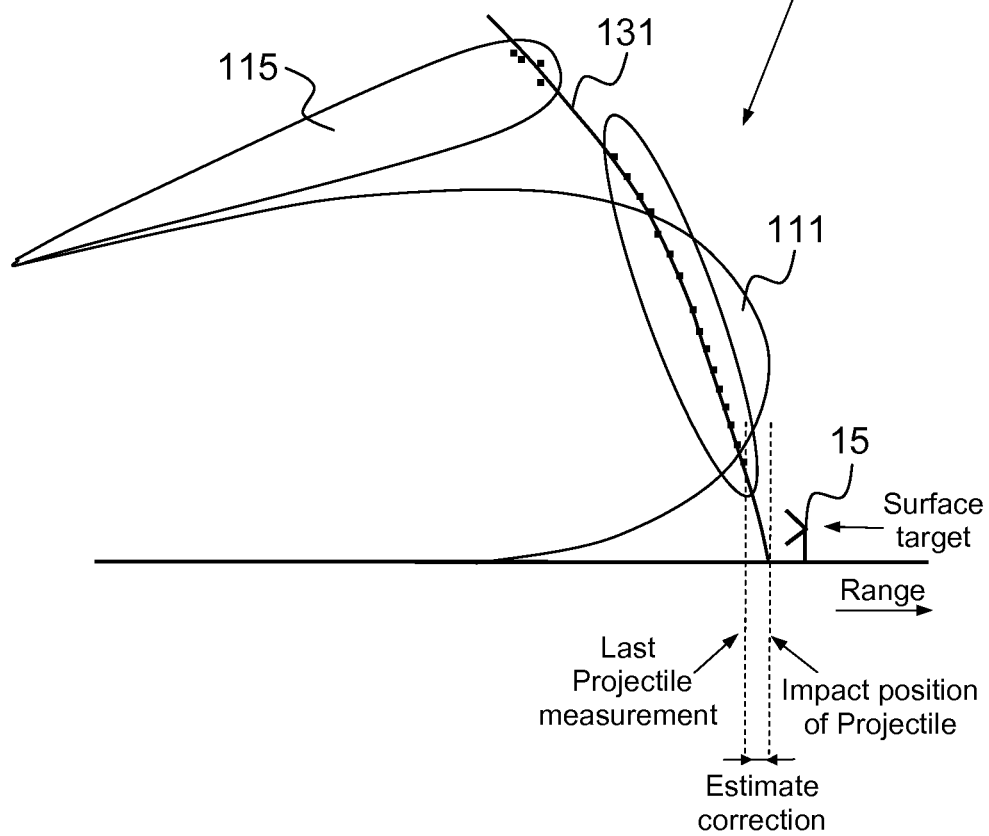
Figure 2:
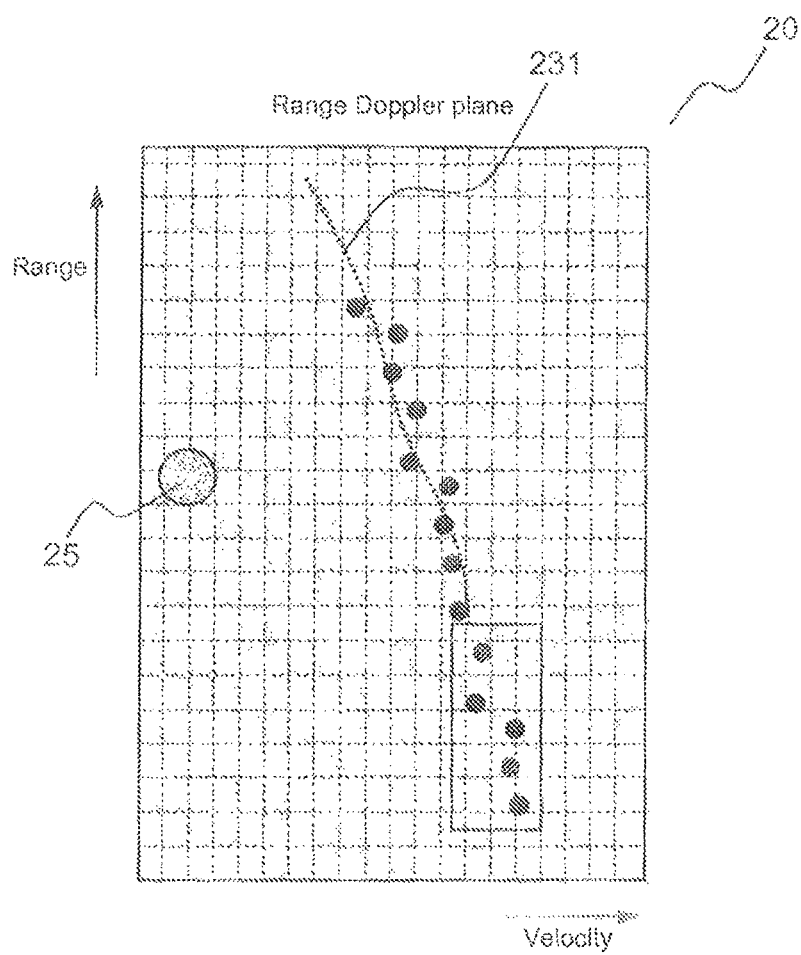

FIGS. 1a and 1b schematically illustrate an exemplary embodiment of the invention;

FIG. 2 illustrates an example projectile trajectory represented in a range Doppler plane.

FIGS. 1a and 1b schematically illustrate a carrier 10, a boat in the illustrated example, on which is mounted a radar antenna 11, which is tracking a target 15, located just above the sea level in the illustrated example. The radar antenna 11 emits electromagnetic signals, and presents a main lobe 111 forming a dedicated antenna beam, represented in FIG. 1a by a curved dotted line, the antenna beam being essentially pointed toward the target 15. The radar antenna 11 also presents side lobes, two sidelobes 113 and 115 being represented in FIG. 1a, also by curved dotted lines. The carrier 10 is also bearing a gun 13 firing projectiles. An example projectile trajectory 131 is represented in FIGS. 1a and 1b by a curved line.

According to the present invention, it is proposed that the radar antenna 11 through said dedicated antenna beam, typically used for tracking targets, is also used for tracking the fired projectiles. The radar antenna 11 can for example be part of a monopulse radar system. Target tracking with a monopulse radar is typically performed by means of a control loop which keeps the radar antenna beam pointed in the direction of the target as shown in the FIGS. 1a and 1b. The target can then be monitored, for example by means of a video camera mounted in parallel with the radar antenna. In a target tracking radar, the azimuth and bearing of the target can be measured by means of monopulse reception channels. The target's velocity and acceleration can be determined based upon the radar's range and angle measurements as a function of time. According to a specificity of the present invention, no elevation measurements are needed.

When the gun 13 is firing projectiles to reach the target 15, the projectiles can be seen from the radar measurements, since their trajectory 131 then may be passing through the radar antenna beam pointed at the target and sidelobes, as illustrated by FIG. 1b, which is a zoom-in of FIG. 1a, in the vicinity of the target 15.

The present invention proposes to predict the impact point of the projectiles level with the sea surface, based upon tracking of the projectiles rather than directly determining the impact point itself. For the purpose of detecting and tracking the projectile separate from the target, the present invention proposes to resort to Doppler filtering.

As it is known from the theory, the relative radial velocity of a target with respect to an observer shifts the frequency of the transmitted pulse to another frequency received by the observer. This Doppler shift is a known function of transmitted frequency and relative radial speed between the observer and the target. This shift in frequency, called the Doppler frequency, can be estimated by use of Doppler filtering and the relative radial speed from the target with respect to the radar can be derived from this Doppler frequency using the aforementioned function. When Doppler filtering is performed for a number of subsequent ranges, a so-called Range-Doppler plane can be built up. This plane shows for each range the content of the Doppler spectrum. Doppler filtering can for example be used in known radar systems in order to separate target and clutter echoes based upon the Doppler effect. The Doppler filtering is performed on a number of successive radar transmissions, known as radar bursts and can be performed for instance by means of Fast Fourier Transforms, usually designated by the corresponding acronym "FFT".

Thanks to the Doppler effect, both the fired projectile and the tracked target 15 can be detected simultaneously and even at a same range. In fact, since the projectile does have a different Doppler frequency from the surface target 15 and from the sea clutter, the projectile can be detected separately from the target 15 until it hits the sea surface or the target 15. The projectile measurements are represented on FIG. 1b by dots along the trajectory 131. The range and the bearing of the last measurement of the projectile provides an indication of the actual impact position.

Advantageously, the impact position prediction accuracy may be further improved. Indeed, the position of the last detection of the projectile is likely to differ slightly from the actual impact position. The range error may notably be dependent on the measurement update frequency, on the lobing and on the dive angle at the end of the projectile trajectory.

This range error may be predicted to obtain a correct estimation for the impact point of the projectile. By using all the measurements of the projectile prior to the impact rather than only the last measurement, the estimate of the impact range and bearing may be improved.

Hereby, the measurements allowed by the single radar antenna 11 and dedicated antenna beam yield kinematics of the projectile along its trajectory 131, such as its range, azimuth and speed. The impact position can be estimated more precisely using the estimated kinematics to extrapolate from the last measurement of the position of the projectile to the level of the sea surface as described more in detail below. Estimation can be realized by means of a Kalman filter, a least squares method, or any other appropriate algorithm. It is worth noting that the exemplary embodiment of FIGS. 1a and 1b operates by use of the single radar antenna 11, which is tracking the surface target 15, without being hampered by multipath effect or echoes from any large surface target.

FIG. 2 illustrates an example projectile trajectory represented in a range Doppler plane 20.

When Doppler filtering is applied for a plurality of ranges, one can obtain a so called "Range-Doppler plane" of which FIG. 2 shows an example. The Range-Doppler plane 20 shows the radar echoes within a radar beam as a function of the range, represented along the Y-axis, and Doppler speed, represented along the X-axis. Typically, the tracking radar can operate within the I band, that is: around a central frequency of 9 GHz, between 8 and 10 GHz, and the antenna beam can have a 3-dB width of typically 2 degrees of angle. With such an exemplary configuration, the resulting Doppler spectrum can have an ambiguous velocity coverage of typically 100 ms. The sampling in term of range is dependent on the instantaneous bandwidth of the radar and is typically in the order of 50 meters per range sample.

The Range-Doppler plane 20 illustrated in FIG. 2 shows a plurality of dots corresponding to a projectile following a trajectory 231. The Range-Doppler plane 20 also shows the echo 25 of the surface target. Building up the Range-Doppler plane is a burst-based process. One burst consists of several radar transmissions, which can also be referred to as sweeps or pulses. Then for all ranges, and for all pulses in one burst, the return signal is sampled. For each range an FFT can be realized over these samples of the return signals of the transmissions providing a Doppler spectrum per frequency, as a signal strength. Along the trajectory 231, the signal strength is non-zero for all frequencies. At the actual position of a target in the Range-Doppler plane, the signal strength presents a peak value. Target detection consists of discriminating the peak values from other values that correspond to noise, the dots corresponding to these peak values being represented in the Range-Doppler plane illustrated in FIG. 2.

The target can be tracked by predicting its range and Doppler velocity from burst to burst. When a projectile is fired at the target, the echoes of the projectile do appear with different Doppler speeds compared to the surface target or, in other words, through different Doppler filters. The dots representing the projectile in the range Doppler plane 20 can be associated with the time instants when the detections are performed. These time instants can be denoted $t_i$, i being an integer varying from 1 to n, $t_1$ denoting the time instant corresponding to the first detection of the projectile by the radar, $t_n$ denoting the time instant corresponding to the last detection of the projectile. After the time instant $t_n$, the projectile can no longer be detected by the radar: after this time instant, and before the next expected detection at time instant $t_{n+1}$, the projectile has either hit the water surface or the target, and can therefore no longer induce radar echoes. In certain cases, for example if the projectile comprises an explosive load, a water splash can be seen in the range Doppler spectrum.

As proposed by the current invention, the impact point of the projectile can be predicted, for example by assuming the impact of the projectile occurs at a time instant $t_{impact}$ shortly after the instant of time $t_n$ corresponding to the last detection of the projectile. As a non-limiting example the time instant $t_{impact}=(t_n+t_{n+1})/2$ gives a better estimate as the error is at most half the timestep $t_{n+1}-t_n$ where the maximum error at $t_n$ is equal to this timestep.

Moreover, starting from the first time instant $t_1$ when the projectile echo is appearing in the Range-Doppler plane 20, that is: as soon as the projectile is detected, a projectile track can be initialized, by means of a tracking technique already known per se, for example based upon a Kalman filter. Similarly, different tracks can be simultaneously associated to a plurality of projectiles possibly seen simultaneously by the radar. Therefore, a method according to the present invention may be applied to weapons firing at high rates.

Advantageously, the decision, whether a given projectile did actually hit the water, can be made after a number of missing detections higher than a given determined number, or in other words, if no measurements could be collected over a given period of time, which can be referred to as a "time out" period. The determined number can be chosen so that the track of a given projectile survives the time period during which the projectile is to be located between two antenna sidelobes or an antenna sidelobe and the main beam: during this period of time, no detections can be made of the projectile. As a typical example, using a target tracking system operating in the I band, the sidelobe separation is approximately equal to 2.5 degrees of angle. With a terminal velocity in the order of 400 ms, the flight time from a top of a sidelobe to another, is approximately equal to 1 second at a range of 10 kilometers. The time of flight in the main lobe of the antenna (+/−1 degree) is in the order of 0.5 second.

Advantageously, in order to improve the detection performance, burst integration can be resorted to. For example, the track of a given projectile can be considered as valid when at least first determined number N of detections out of a second given number M have been actually realized.

For example, the incoherent integration gain in the case of using a track validity condition of 3 out of 8 pulses, can be almost as high as 5 dB in the case of a nonfluctuating target.

Advantageously, the accuracy of the detections, that is: of the measurement of the range and Doppler speed of targets and projectiles, can be further improved by means of interpolation.

For example, an interpolation process can allow obtaining a Doppler accuracy in the order of 1 ms and a range accuracy in the order of 1 meter. Using the interpolated range and Doppler values for the purpose of trajectory evaluation can therefore allow realizing a strong discrimination against false targets. In relation to the ambiguous Doppler velocity (10 ms) and the range area which is needed for detection of the projectile (1 km) a reduction of false alarms by 100,000 can be obtained by the comparison of subsequent detections.

Advantageously, additional means for measuring or assessing the projectile speed, such as physical models, for example associated with means for measuring the initial speed of the projectiles, can be used in order to reduce possible false positives.

Advantageously, the last detections of a given projectile can be used to improve the range and azimuth estimates, for example by means of a least squares method, and to improve the predictive location of the impact point at the estimated $t_{impact}$.

Typically, 0.5 seconds of measurements can be integrated, corresponding to the time the projectile is staying within the antenna mainlobe.

It is to be noted that the impact point location is as much as accurate as the update rate of the radar bursts is high.

In addition of avoiding the use of a separate antenna beam, a further advantage of the invention is that it may be applied with weapons firing at high firing rates, independently from the type of ammunition they use. The current invention is also suitable for the prediction of a direct hit, that is: even if the projectile does not induce any water splash. Therefore, the current invention can apply with weapons using a great diversity of ammunition, for example target-practice rounds as well as rounds comprising an explosive load.

One further advantage of the current invention lies in that projectiles, surface targets can be tracked, while a video camera, for example, can be simultaneously used for monitoring the target.

One further advantage is that a method following to any embodiment of the current invention can be used despite the non-linearity of the radar antenna measurements level with the edge of the antenna beam.

It is to be understood that variations to the examples described herein, such as would be apparent to the skilled addressee, may be made without departing from the scope of the present invention.

The invention claimed is:
1. A method for determining an impact point of a projectile fired at a surface target, in a radar system comprising a single radar antenna for tracking the surface target, the single radar antenna emitting electromagnetic signals forming a single antenna beam essentially pointing toward the surface target, a trajectory of the projectile passing through the antenna beam of the single radar antenna, wherein the method comprises:
   emitting a number of successive radar bursts;
   measuring a plurality of ranges of radar echoes received at least one of within the antenna beam or through sidelobes formed by the electromagnetic signals, in response to the radar bursts;

applying Doppler filtering for the plurality of ranges to distinguish the projectile measurements from measurements related to the tracked surface target and sea clutter measurements;

performing a detection of the projectile at successive times using the Doppler filtering;

predicting the impact point of the projectile from the projectile measurements related to one or more detections of the projectile, including the range, a bearing, and a time;

simultaneously tracking the surface target using the antenna beam; and determining that the projectile hit a water surface or the surface target if no projectile measurement has been obtained over a period of time longer than a given time-out period after a time $t_n$ corresponding to the time of the last detection of the projectile, wherein the given time-out period of time corresponds to a time period during which the projectile is to be located between two sidelobes or between a sidelobe and the antenna beam.

2. The method of claim 1, wherein the time $t_{impact}$ at which the impact of the projectile occurs is determined by use of an estimation technique comprising a least squares method.

3. The method of claim 1, wherein the time $t_{impact}$ at which the impact of the projectile occurs is determined by use of an estimation technique comprising a Kalman filter.

4. The method of claim 1, wherein the predicting the impact point of the projectile is based upon an assumption that the impact of the projectile occurs at a time $t_{impact}$ after a time $t_n$ corresponding to the time of the last detection of the projectile.

5. The method of claim 4, wherein the time $t_{impact}$ is related to $(t_n+t_{n+1})$, with $t_{n+1}$ being the next time at which the projectile is expected to be detected successively to time $t_n$.

6. The method of claim 5, wherein the time $t_{impact}$ is defined by the relation: $t_{impact}(t_n+t_{n+1})/2$.

7. The method of claim 1, wherein said measurements further comprise the speed of the projectile.

8. A radar system comprising a single radar antenna for tracking a surface target and a processing means for determining an impact point of a projectile fired at the surface target, the single radar antenna emitting electromagnetic signals forming a single antenna beam essentially pointing towards the surface target, a trajectory of the projectile passing through the beam of the single radar antenna, wherein the radar system is configured to:

emit a number of successive radar bursts;

measure a plurality of ranges of radar echoes received at least one of within the antenna beam or through sidelobes formed by the electromagnetic signals, in response to the successive radar bursts;

detect the projectile at successive times by applying Doppler filtering;

predict the impact position of the projectile from measurements related to one or more detected positions of the projectile including the range, a bearing, and a time;

simultaneously track the surface target using the antenna beam; and determine that the projectile hit a water surface or the surface target if no projectile measurement has been obtained over a period of time longer than a given time-out period after a time $t_n$ corresponding to the time of the last detection of the projectile, wherein the given time-out period of time corresponds to a time period during which the projectile is to be located between two sidelobes or between a sidelobe and the antenna beam.

9. The radar system of claim 8, wherein the step of predicting the impact point of the projectile is based upon an assumption that the impact of the projectile occurs at a time $t_{impact}$ after a time $t_n$ corresponding to the time of the last detection of the projectile.

10. The radar system of claim 9, wherein the time $t_{impact}$ is related to $(t_n+t_{n+1})$, with $t_{n+1}$ being the next time at which the projectile is expected to be detected successively to time $t_n$.

11. The radar system of claim 10, wherein the time $t_{impact}$ is defined by the relation: $t_{impact}(t_n+t_{n+1})/2$.

12. The radar system of claim 9, wherein the time $t_{impact}$ at which the impact of the projectile occurs is determined by use of an estimation technique comprising a least squares method.

13. The radar system of claim 9, wherein the time $t_{impact}$ at which the impact of the projectile occurs is determined by use of an estimation technique comprising a Kalman filter.

14. The radar system of claim 8, wherein said measurements further comprise the speed of the projectile.

\* \* \* \* \*